United States Patent
Peng et al.

(10) Patent No.: US 11,120,824 B1
(45) Date of Patent: Sep. 14, 2021

(54) BOLOMETRIC SENSOR FOR A HEAT-ASSISTED MAGNETIC RECORDING DEVICE

(71) Applicant: Seagate Technology LLC, Fremont, CA (US)

(72) Inventors: Chubing Peng, Eden Prairie, MN (US); Vivek Krishnamurthy, Edina, MN (US); Nils Jan Gokemeijer, Minneapolis, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/003,355

(22) Filed: Aug. 26, 2020

(51) Int. Cl.
*G11B 11/105* (2006.01)
*G11B 5/48* (2006.01)
*G11B 5/60* (2006.01)
*G11B 5/00* (2006.01)

(52) U.S. Cl.
CPC ......... *G11B 5/4866* (2013.01); *G11B 5/6005* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | |
|---|---|---|
| 6,885,795 B1 | 4/2005 | Hsu et al. |
| 6,915,047 B1 | 7/2005 | Mekis et al. |
| 8,358,565 B2 * | 1/2013 | Komura .......... G11B 5/314 369/13.33 |
| 8,670,295 B1 * | 3/2014 | Hu ................ G11B 5/105 369/13.33 |
| 8,755,256 B2 * | 6/2014 | Maletzky ........ G11B 5/6088 369/13.33 |
| 8,842,506 B1 * | 9/2014 | Matsumoto ...... G11B 5/6088 369/13.33 |
| 8,861,124 B1 | 10/2014 | Finot et al. |
| 9,053,717 B1 * | 6/2015 | Matsumoto ....... G11B 5/105 |
| 9,245,553 B2 * | 1/2016 | Boone, Jr. ........ G11B 5/105 |
| 9,281,659 B1 | 3/2016 | Tatah et al. |
| 9,336,831 B2 | 5/2016 | Burnett et al. |
| 9,431,037 B2 | 8/2016 | Kozlovsky et al. |
| 9,607,638 B1 | 3/2017 | Olson et al. |
| 9,653,121 B1 | 5/2017 | Chu et al. |
| 9,679,594 B1 * | 6/2017 | Peng ............... G02B 6/124 |

(Continued)

FOREIGN PATENT DOCUMENTS

WO 2016/119576 8/2016

*Primary Examiner* — Tan X Dinh
(74) *Attorney, Agent, or Firm* — Mueting Raasch Group

(57) ABSTRACT

An apparatus comprises a slider configured for heat-assisted magnetic recording comprising an air bearing surface (ABS). The slider comprises a write pole at or near the ABS, and a near-field transducer (NFT) at or near the ABS and proximate the write pole. A main waveguide is configured to receive light from a laser source and communicate the light to the NFT. An optical power sensor comprises a tap waveguide optically coupled to the main waveguide and comprising a first end and an opposing second end. The optical power sensor also comprises a bolometer optically coupled to the tap waveguide and configured to receive a portion of the light extracted from the main waveguide by the tap waveguide.

22 Claims, 10 Drawing Sheets

(56) References Cited

U.S. PATENT DOCUMENTS

| | | | |
|---|---|---|---|
| 9,691,424 B2 | 6/2017 | Duda et al. | |
| 9,870,787 B1* | 1/2018 | Wessel | G01J 5/0818 |
| 9,875,767 B2 | 1/2018 | Duda et al. | |
| 9,905,996 B2 | 2/2018 | Wessel et al. | |
| 9,916,849 B1 | 3/2018 | Mader et al. | |
| 9,953,670 B1 | 4/2018 | Mu et al. | |
| 9,987,419 B2 | 6/2018 | Hanson et al. | |
| 10,014,016 B1* | 7/2018 | Mehfuz | G11B 5/314 |
| 10,061,082 B1* | 8/2018 | Peng | H01S 3/063 |
| 10,127,940 B1 | 11/2018 | Wessel et al. | |
| 10,255,940 B1 | 4/2019 | Macken et al. | |
| 10,395,680 B1 | 8/2019 | Wessel et al. | |
| 10,410,669 B1 | 9/2019 | Wessel et al. | |
| 10,580,444 B1 | 3/2020 | Macken et al. | |
| 10,580,446 B1 | 3/2020 | Wessel | |
| 10,692,525 B2 | 6/2020 | Goggin et al. | |
| 2008/0204916 A1* | 8/2008 | Matsumoto | G11B 5/6088 360/59 |
| 2012/0092971 A1* | 4/2012 | Schreck | G11B 5/105 369/13.24 |
| 2012/0155232 A1* | 6/2012 | Schreck | G11B 5/314 369/13.33 |
| 2016/0284372 A1* | 9/2016 | Duda | G11B 11/14 |

* cited by examiner

BOLOMETRIC SENSOR FOR A HEAT-ASSISTED MAGNETIC RECORDING DEVICE

SUMMARY

Embodiments are directed to an apparatus comprising a slider configured for heat-assisted magnetic recording comprising an air bearing surface (ABS). The slider comprises a write pole at or near the ABS, and a near-field transducer (NFT) at or near the ABS and proximate the write pole. A main waveguide is configured to receive light from a laser source and communicate the light to the NFT. An optical power sensor comprises a tap waveguide optically coupled to the main waveguide and comprising a first end and an opposing second end. The optical power sensor also comprises a bolometer optically coupled to the tap waveguide and configured to receive a portion of the light extracted from the main waveguide by the tap waveguide.

Embodiments are directed to apparatus comprising a slider configured for heat-assisted magnetic recording comprising an ABS. The slider comprises a write pole at or near the ABS, and an NFT at or near the ABS and proximate the write pole. A main waveguide is configured to receive light from a laser source and communicate the light to the NFT. A tap waveguide is optically coupled to the main waveguide and comprises a first end and a second end. A light absorbing or anti-reflection feature is situated at or proximate the second end of the tap waveguide. A bolometer is optically coupled to the first end of the tap waveguide and configured to receive a portion of the light extracted from the main waveguide by the tap waveguide. The bolometer is configured to detect only a forward propagating mode that excites the NFT and a back reflection enters the bolometer only from a reflection of the second end of the tap waveguide.

Embodiments are directed to a method comprising communicating light from a laser source to a near-field transducer of a slider configured for heat-assisted magnetic recording via a main waveguide of the slider. The method also comprises extracting a portion of the light from the main waveguide by a tap waveguide comprising a first end and an opposing second end. The method further comprises detecting, by a bolometer situated at or proximate the first end of the tap waveguide, only a forward propagating mode that excites the NFT such that a back reflection enters the bolometer only from a reflection of the second end of the tap waveguide. The method can also comprise determining output optical power of the light source using a signal generated by the bolometer.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
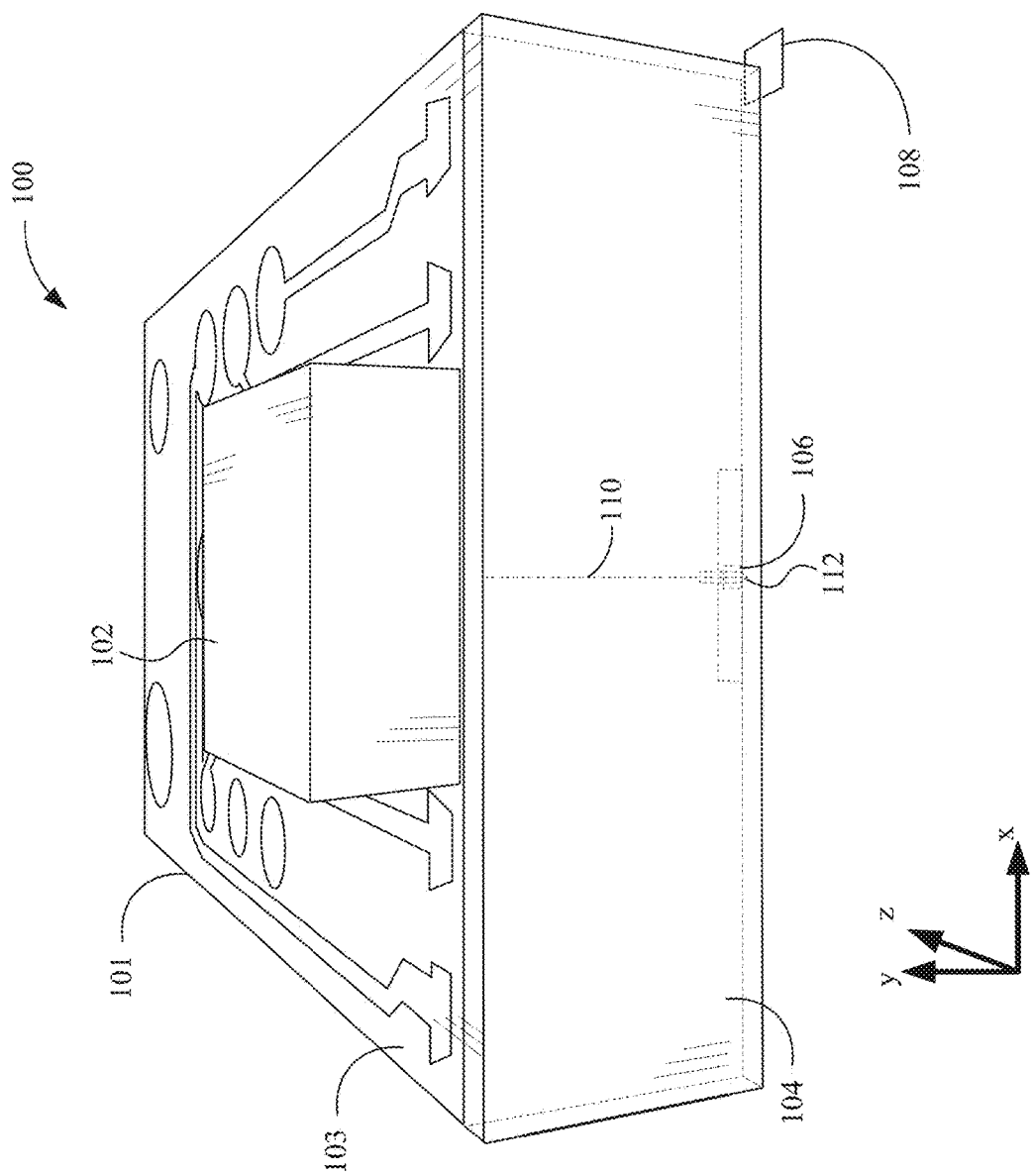
FIG. 1 is a perspective view of a HAMR slider assembly according to a representative embodiment.

The present disclosure relates to heat-assisted magnetic recording, which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR slider, sometimes referred to as a read/write element, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path, which includes an optical waveguide and a plasmonic transducer, is integrated into the HAMR slider to deliver the energy to the surface of the media.

The plasmonic transducer of a HAMR slider is typically situated proximate a media-facing surface (e.g., air-bearing surface) of the slider. The plasmonic transducer shapes and transmits the energy to a small region on the medium. The plasmonic transducer is sometimes referred to as a near-field transducer, optical antenna, surface plasmon resonator, etc., and may include a plasmonic metal such as gold, silver, copper, aluminum, rhodium, iridium, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature of the magnetic storage layer having dimensions less than 100 nm (e.g., ~50 nm).

The output of a laser diode used in a HAMR drive is temperature sensitive and susceptible to self-heating. During write operation, for example, laser diode heating can vary the junction temperature of the laser diode, causing a shift in laser emission wavelength, leading to a change of optical feedback from the optical path in the slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping, magnetic transition shifting from one block of data to another, and encroachment in track width. Large transition shifts in a block of data may not be recoverable by channel decoding, resulting in error bits. Accurate laser power monitoring can be particularly helpful in mitigating the impact of mode hopping by use of automatic laser power control in HAMR devices.

One conventional approach to monitoring output optical power of a HAMR light source (e.g., laser diode) involves the use of a bolometer placed directly above the waveguide. Conventional laser power monitoring arrangements (e.g., wafer power monitors) do not provide a mode hopping (MH) detection capability, due to the moving of standing waves formed by the incident and back reflected light underneath the bolometer resulting from the mode hopping.

Embodiments of the disclosure are directed to an optical power sensor arrangement which is integrated in a HAMR slider proximate the main optical waveguide of the slider and advantageously provide for detection of laser power variation, for instance, mode hopping. Embodiments are directed to an optical power sensor which includes a tap waveguide optically coupled to the main waveguide of the slider and a bolometer situated at one end of the tap waveguide. According to various embodiments, a WPM (wafer power monitor) bolometer is placed on one end of the tap waveguide such that the bolometer detects only the forward propagating mode to NFT excitation. In this configuration, the back reflection enters the bolometer only from the reflection of the other end of the tap waveguide, due to termination, and its impact on mode hopping detection is reduced at least by a factor of 5 (e.g., at least a 5-, 6-, 7-, 8-, 9-, or 10-fold reduction). With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface that maintains separation from the media surface via a thin layer of air. The laser diode 102 delivers light to a region proximate a HAMR read/write head 106, which is located near the media-facing surface 108. The energy is used to heat the recording media as it passes by the read/write head 106. Optical coupling components, such as a waveguide 110, are formed integrally within the slider body 101 (near a trailing edge surface 104 in this example) and function as an optical path that delivers energy from the laser diode 102 to the recording media via an NFT 112. The NFT 112 is near the writer of the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (see, e.g., submount 105 in FIGS. 4-7). A submount can be used to orient an edge-emitting laser so that its output is directly downwards (negative y-direction in the figure).

While the representative embodiment in FIG. 1 shows a laser diode 102 directly mounted to the slider body 101, the waveguide 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
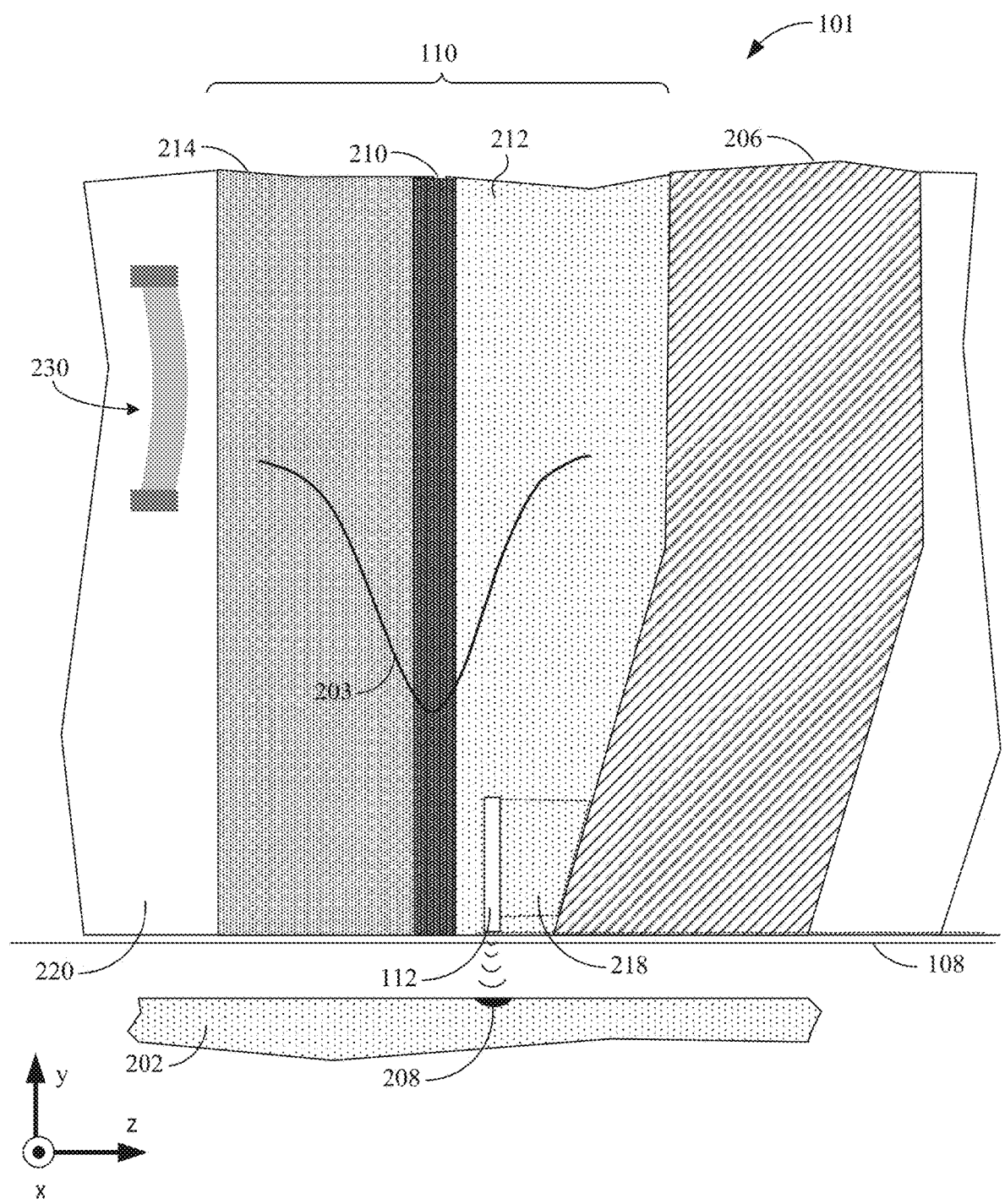
FIG. 2 is a cross-sectional view illustrating portions of the slider body shown in FIG. 1 near the NFT according to a representative embodiment.

In FIG. 2, a cross-sectional view illustrates portions of the slider body 101 according to a representative embodiment. In this view, the NFT 112 is shown proximate to a surface of a magnetic recording medium 202, e.g., a magnetic disk. The waveguide 110, which can be a channel waveguide (CWG), delivers electromagnetic energy to the NFT 112, which directs the energy to create a small hotspot 208 on the recording medium 202. A magnetic write pole 206 causes changes in magnetic flux near the media facing surface 108 in response to an applied current. Flux from the write pole 206 changes a magnetic orientation of the hotspot 208 as it moves past the write pole 206 in the downtrack direction (z-direction).

In some embodiments, the waveguide 110 includes a mode order converter (see, e.g., FIGS. 4-7) configured to convert light 203 from a light source (e.g., laser 102 in FIG. 2) at a fundamental transverse electric (TE) mode (e.g., $TE_{00}$) to a higher-order TE mode (e.g., TEE)), or a polarization rotator configured to convert light 203 at a fundamental transverse electric (TE) mode to a fundamental transverse magnetic (TM) mode. The NFT 112 receives the light 203 at the higher-order mode and generates surface plasmons that heat the magnetic recording medium 202. The NFT 112 may include or be coupled to a heat sink 218 that extends to the write pole 206.

The waveguide 110 is formed via a layer of core material 210 surrounded by cladding layers 212 and 214. The core layer 210 and cladding layers 212, 214 may be made from dielectric materials such as $Al_2O_3$, $SiO_xN_y$, $SiO_2$, $Ta_2O_5$, $TiO_2$, ZnS, $SiN_x$, $Nb_2O_5$, SiC, AlN, $Hf_2O_5$, $Y_2O_3$, etc. Generally, the dielectric materials are selected so that the refractive index of the core layer 210 is higher than refractive indices of the cladding layers 212 and 214. This arrangement of materials facilitates efficient propagation of light through the waveguide 110 through the total-internal-reflection (TIR) at the cladding-core interface.

In the embodiment shown in FIG. 2, the slider body 101 incorporates an optical power sensor 230. As shown, the optical power sensor 230 is situated adjacent the cladding layer 214 and spaced apart from the waveguide 110, such that no portion of the optical power sensor 230 overlaps with the waveguide 110. In some embodiments, the optical power sensor 230 can be situated within the cladding layer 214 and spaced apart from the core material 210 of the waveguide 110, such that the optical power sensor 230 does not directly interact with the optical field of the waveguide 110. In general, the optical power sensor 230 is situated relative to the waveguide 110 such that the optical power sensor 230 senses a small amount of light that is communicated along the waveguide 110 and used during a write operation. A signal generated by the optical power sensor 230 can be communicated to measuring circuitry (e.g., see FIG. 9), which is typically situated externally of the slider 100 of a HAMR device. The measuring circuitry can be configured to measure output optical power of the light source using a signal generated by the bolometer and adjust the laser current correspondingly to keep the laser output power constant.

Figure 3:
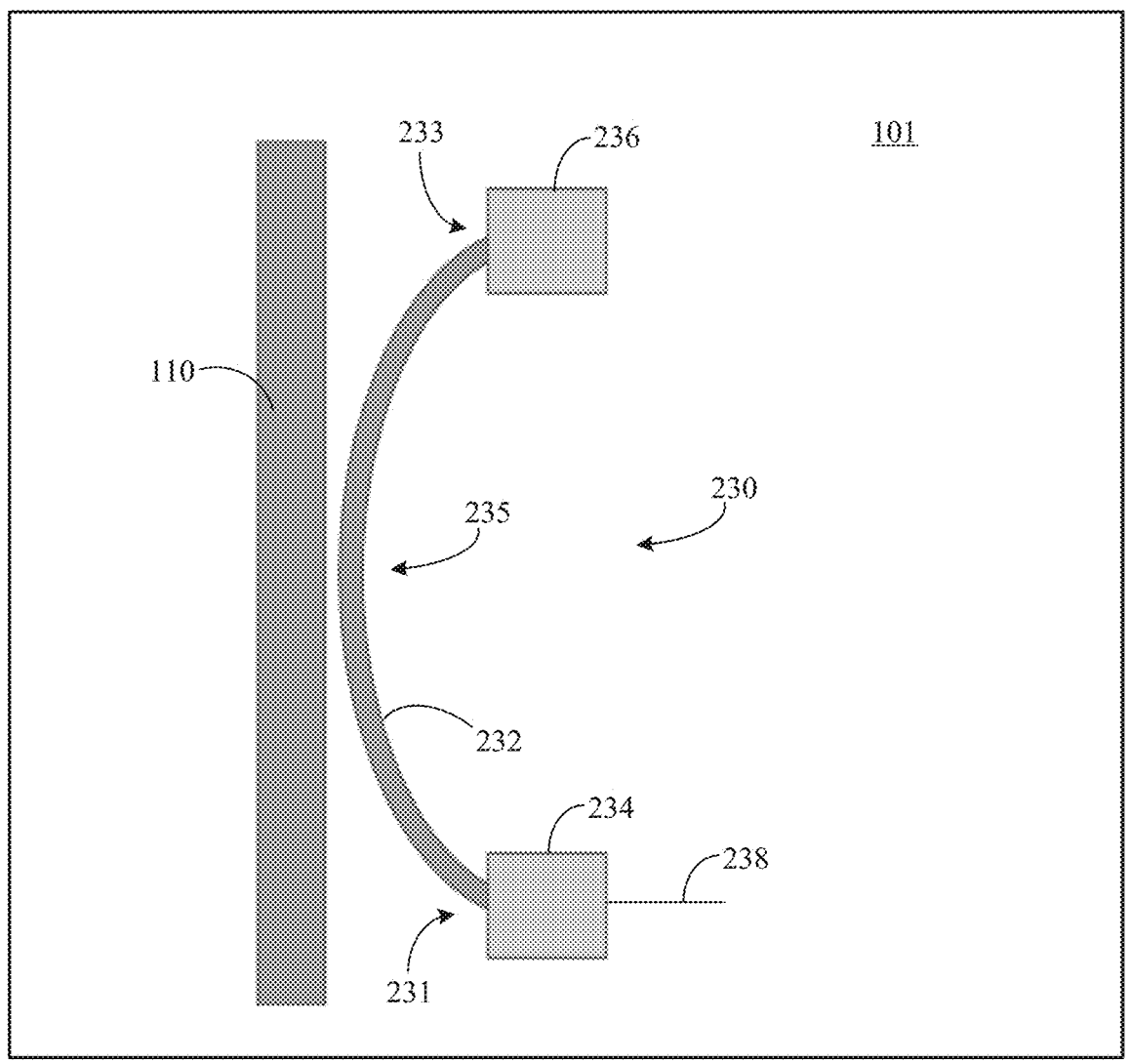
FIG. 3 illustrates an optical power sensor in accordance with various embodiments.

FIG. 3 illustrates an optical power sensor 230 in accordance with various embodiments. The optical power sensor 230 includes a tap waveguide 232 which is optically coupled to the main waveguide 110 of the slider body 101. As illustrated in FIG. 3, the tap waveguide 232 is situated lateral of the main waveguide 110 along a longitudinal section of the main waveguide 110. As previously discussed, the tap waveguide 232 can be spaced apart from the main waveguide 110 or, in some embodiments, be situated within a cladding layer of the main waveguide 110. The tap waveguide 232 is configured to extract a portion of the light communicated along the main waveguide 110, such as light generated during a write operation.

The tap waveguide 232 includes a first end 231 and an opposing second end 233. The tap waveguide 232 is shown in FIG. 3 to have a generally arcuate shape such that the first and second end 231, 233 are spaced further away from the main waveguide 110 relative to a middle section 235 of the tap waveguide 232. It is understood that the tap waveguide 232 can have shapes that differ from the arcuate shape shown in FIG. 3.

The optical power sensor 230 includes a bolometer 234 situated at or proximate the first end 231 of the tap waveguide 232. The bolometer 234 is situated offset from the main waveguide 110 such that no portion of the bolometer 234 overlaps with the main waveguide 110 (or at least the core material of the main waveguide 110) and there is little optical coupling between the bolometer 234 and the optical field of the main waveguide 110. The bolometer 234 is optically coupled to the first end 231 of the tap waveguide 232 and configured to receive a portion of light extracted from the main waveguide 110 by the tap waveguide 232. A light absorbing or anti-reflection feature 236 is situated at or proximate the second end 233 of the tap waveguide 232. In various embodiments, the bolometer 234 and the light absorbing or anti-reflection feature 236 are configured to provide nearly 100% light absorption (e.g., ≥99%). The tap waveguide 232 can be formed from the same materials and have a similar construction as that of the main waveguide 110 as described hereinabove.

FIGS. 4-7 illustrate different configurations of an optical power sensor 230 positioned relative to a main waveguide 110 of a HAMR slider body 101 in accordance with various embodiments. FIGS. 4-7 show a portion of the body 101 of a HAMR slider 100 in accordance with various embodiments. In FIGS. 4-7, a laser diode 102 is supported by a submount 105 affixed to the slider body 101. The laser diode 102 is optically coupled to the main waveguide 110 of the slider body 101, typically via an optical coupler (not shown).

The main waveguide 110 is configured to communicate light generated by the laser diode 102 to an NFT 112 situated at or proximate the air bearing surface 108 of the slider 100 as previously discussed. In some embodiments, such as those shown in FIGS. 4-7, the main waveguide 110 can include a mode order converter 240, or a polarization rotator (not shown). The mode order converter 240 shown in FIGS. 4-7 includes a branch waveguide 242 that joins with the main waveguide 110 at a waveguide adapter 244. The branch waveguide 242, which may be a tapering branch waveguide, can have a width that controls the mode conversion (e.g., from $TE_{00}$ waveguide mode to $TE_{10}$ waveguide mode, or, e.g., from $TM_{00}$ waveguide mode to $TM_{10}$ waveguide mode). A representative branch waveguide-based mode order converter is disclosed in commonly-owned U.S. Pat. No. 9,322,997, which is incorporated herein by reference.

The tap waveguide 232 is shaped to include a middle section 235 which is situated closer to the main waveguide 110 than the first and second ends 231, 233. As previously discussed, the tap waveguide 232 can have a generally arcuate shape, such that the middle section 235 is separated from the main waveguide 110 (or core material of the main waveguide 110) by a gap, G. In general, the size of the gap, G, impacts the amount of light extracted from the main waveguide 110 by the tap waveguide 232. The size of the gap, G, can range from about 100 nm to about 300 nm, for example.

As is illustrated in FIGS. 4-7, a bolometer 234 is optically coupled to the first end 231 of the tap waveguide 232, and a light absorbing or anti-reflection feature is provided at the second end 233 of the tap waveguide 232. The light absorbing or anti-reflection feature prevents the coupled back reflection (from the main waveguide 110 into the tap waveguide 232) at the termination 233 of the tap waveguide from returning to the first end 231 and the bolometer 234. Each of FIGS. 4-7 illustrates a different light absorbing or anti-reflection feature in accordance with various embodiments.

In general, the bolometer 234 is situated at or proximate to the first end 231 of the tap waveguide 232 such that the bolometer 234 detects only a forward propagating mode that excites the NFT 112. More particularly, the bolometer 234 is situated at or proximate the first end 231 of the tap waveguide 232 such that the bolometer 234 is configured to detect only a forward propagating mode that excites the NFT 112, and a back reflection enters the bolometer 234 only from a reflection of the second end 233 of the tap waveguide 232. The first end 231 is separated far away from the main waveguide 110 such that the bolometer 234 will not interact with the optical field of the main waveguide 110 at this location.

Advantageously, the tap waveguide 232 and the bolometer 234 can be configured to reduce an impact of back reflection on mode hopping detection by at least a factor of about 5 relative to a conventional bolometer implementation if no light absorbing or anti-reflection feature is present at the second end 233 of the tap waveguide 232 (which can be the case in some embodiments). More advantageously, the tap waveguide 232 and the bolometer 234 are configured to reduce an impact of back reflection on mode hopping detection by at least a factor of about 10 relative to a conventional bolometer implementation with a light absorbing or anti-reflection feature present at the second end 233 of the tap waveguide 232.

Each of FIGS. 4-7 illustrates a different light absorbing or anti-reflection structure implemented at the second end 233 of the tap waveguide 232 and configured to reduce the impact of the back reflection coupled from the main waveguide 110. In general, optical power at the bolometer 234 situated at the first end 231 of the tap waveguide 232 can be can characterized by:

Power on bolometer $\propto [1+\alpha_1(1-\alpha)R+2\sqrt{\alpha_1(1-\alpha)R} \cos \varphi]\alpha P_0$ where $\alpha$ represents the coupling ratio from the main waveguide 110 to the tap waveguide 232, $\alpha_1$ represents the reflection coefficient from the second end 233 of the tap waveguide 232, R represents the back reflection coefficient in the main waveguide 110, $\varphi$ represents the phase difference between the reflected back reflection (from the second end 233) and the coupled forward light (from the main waveguide 110 to the tap waveguide 232), and $P_0$ represents initial power flowing in the main waveguide 110. The maximum amount of change in power, $\Delta P$, resulting from mode hopping can be characterized by:

Maximum amount of change in power from MH, $\Delta P \propto 4\sqrt{\alpha_1(1-\alpha)R}\alpha P_0$ Accordingly, the impact of back reflection is reduced by:

$$\frac{1}{\sqrt{\alpha_1(1-\alpha)}}.$$

According to a representative prior state-of-the art design without a tap waveguide, $\Delta P = 4\sqrt{R} \ P_0 = 0.69*P_0$, assuming back reflection R=3%. With a tap waveguide implementation of the present disclosure and assuming that coupling ratio $\alpha$=10% and the reflection coefficient from the second end $\alpha_1$=2%, $\Delta P = 0.093*\alpha*P_0$. The impact of back reflection in this representative scenario is reduced by a factor of about 7 (e.g., ~7x).

Figure 4:
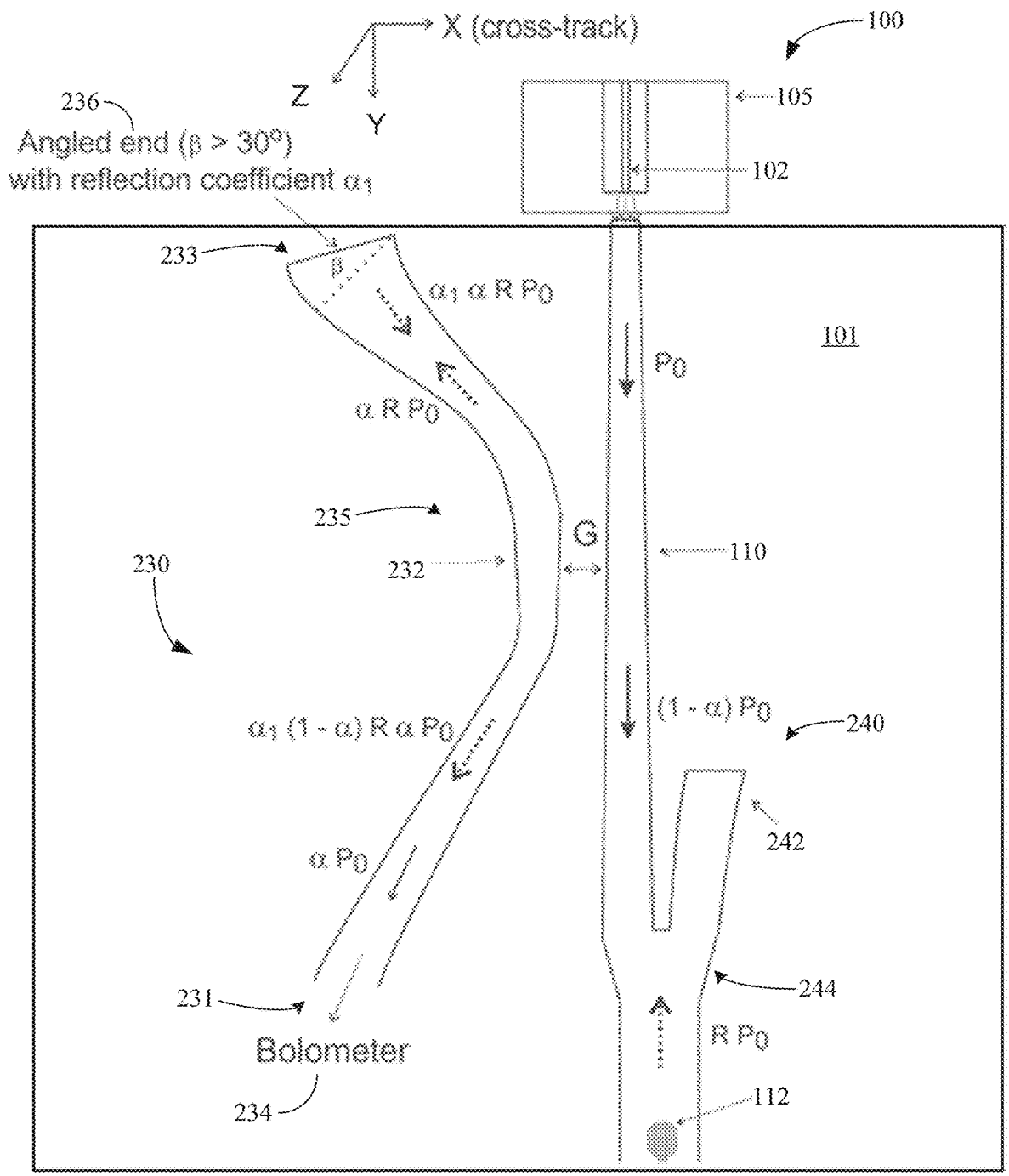
FIG. 4 illustrates a light absorbing or anti-reflection feature provided at one end of a tap waveguide of an optical power sensor in accordance with various embodiments.

In the embodiment shown in FIG. 4, the light absorbing or anti-reflection feature provided at the second end 233 of the tap waveguide 232 is actually an anti-reflection structure that includes an angled end termination 236 (e.g., $\beta$>30°). The angled end termination 236 (with reflection $\alpha_1$) is configured to mitigate reflection from the second end 233 of the tap waveguide 232.

Figure 5:
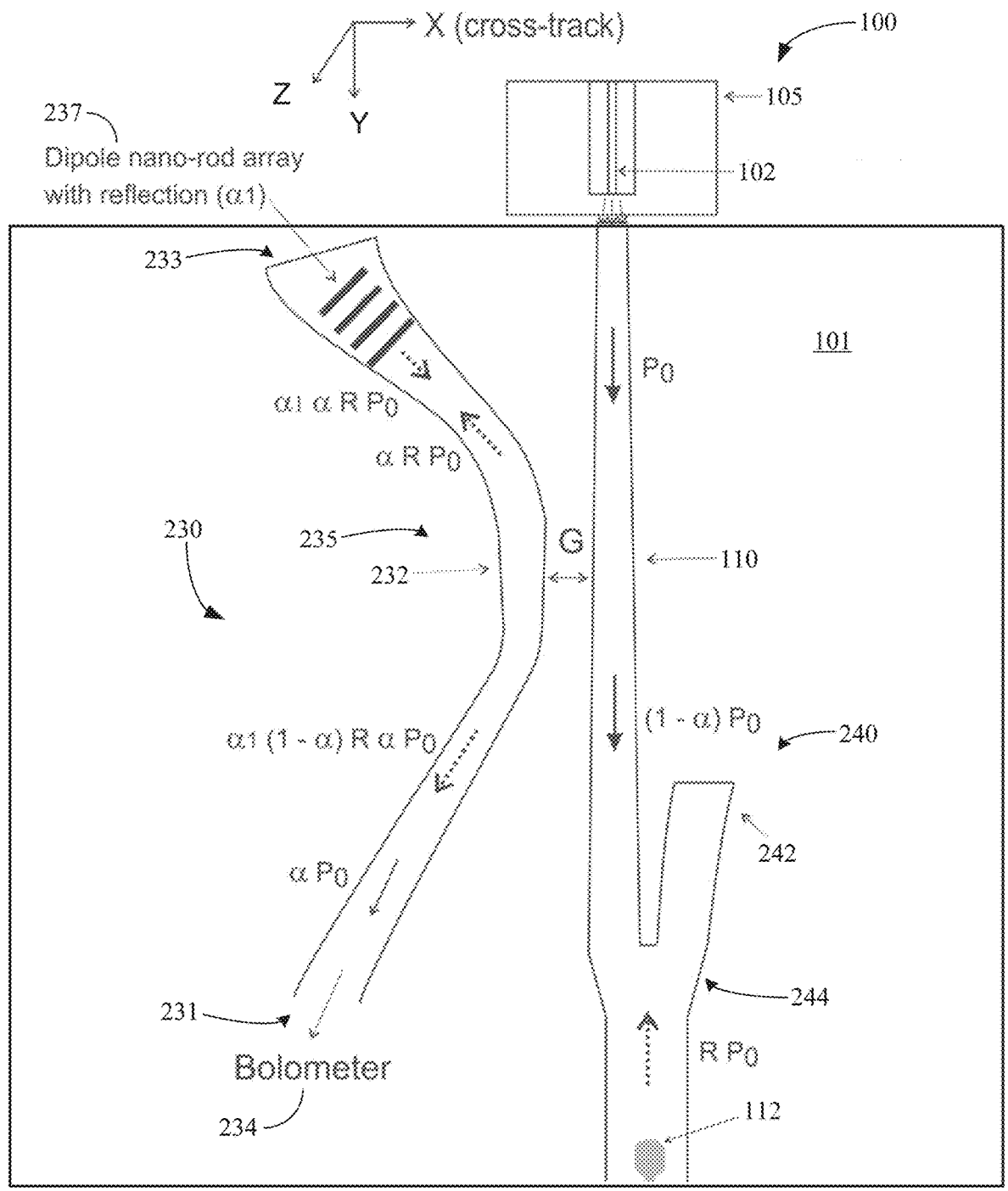
FIG. 5 illustrates a light absorbing or anti-reflection feature provided at one end of a tap waveguide of an optical power sensor in accordance with various embodiments.

In the embodiment shown in FIG. 5, the light absorbing or anti-reflection feature provided at the second end 233 of the tap waveguide 232 includes a dipole nano-rod array 237 (with reflection $\alpha_1$). The dipole nano-rod array 237 is configured to absorb the back reflection coupled from the main waveguide 110 in the tap waveguide 232.

Figure 6:
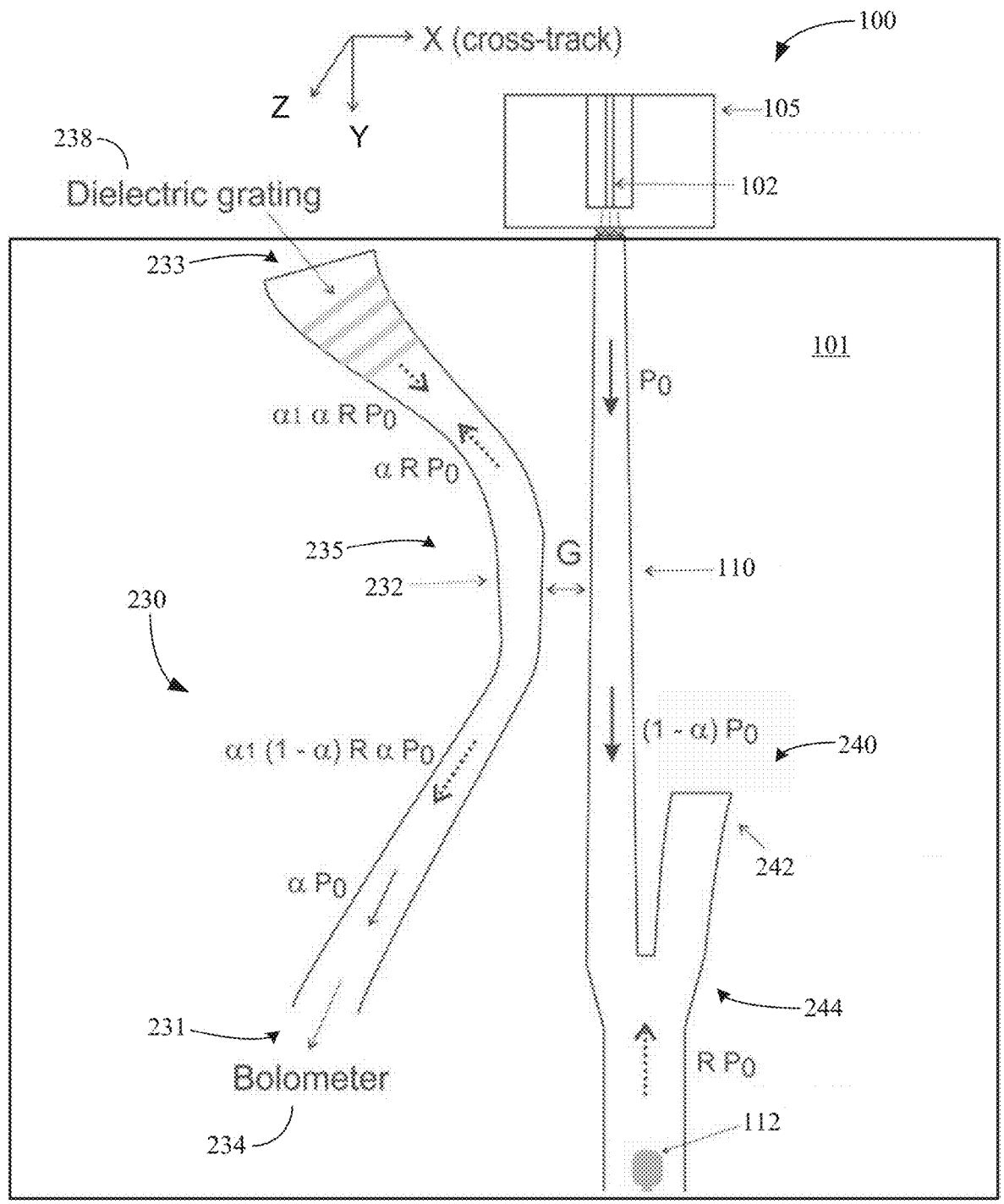
FIG. 6 illustrates a light absorbing or anti-reflection feature provided at one end of a tap waveguide of an optical power sensor in accordance with various embodiments.

In the embodiment shown in FIG. 6, the light absorbing or anti-reflection feature provided at the second end 233 of the tap waveguide 232 includes a dielectric grading 238. The dielectric grating 238 is configured to scatter out the coupled back reflection in the tap waveguide 232.

Figure 7A:
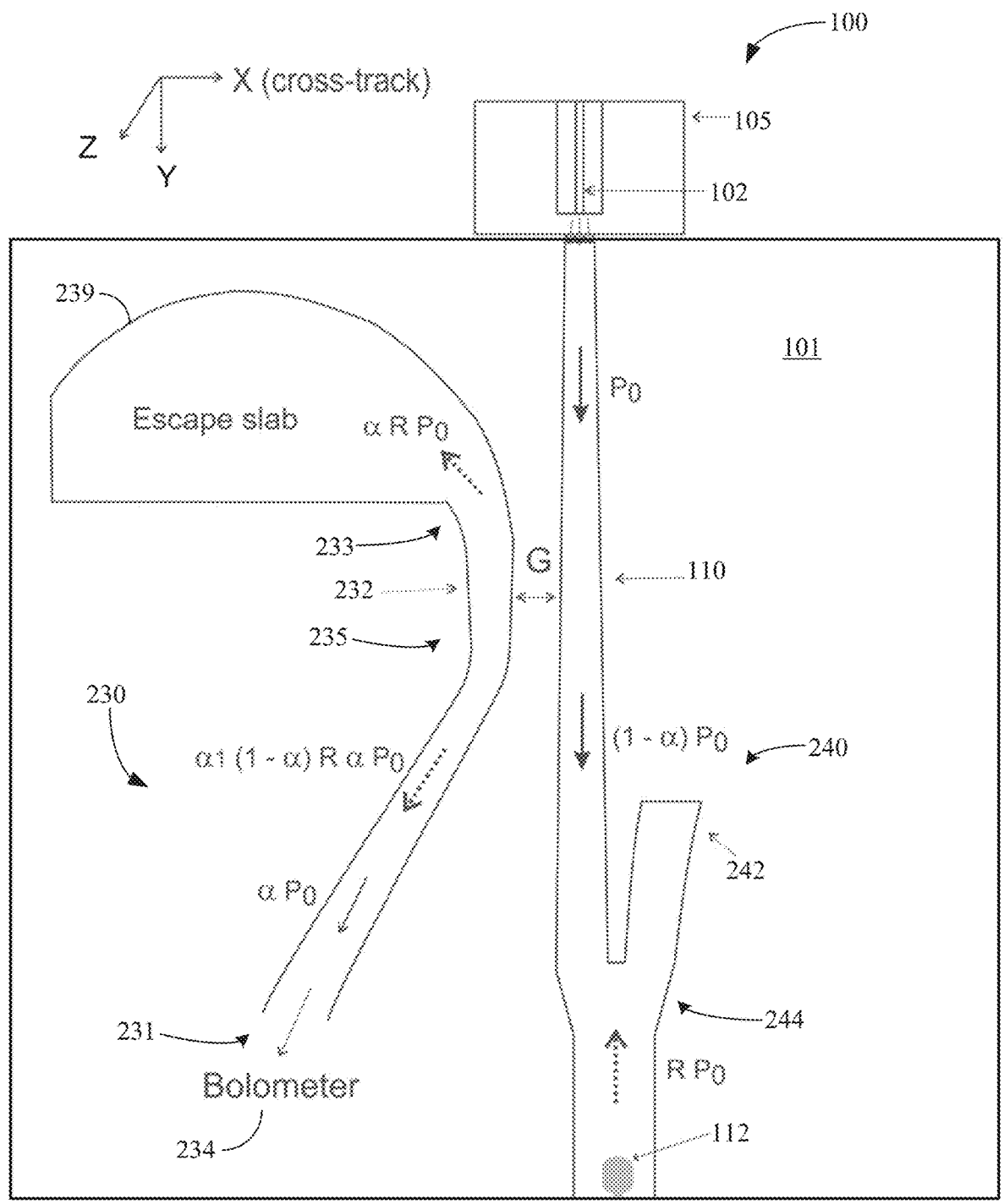
FIG. 7A illustrates a light absorbing or anti-reflection feature provided at one end of a tap waveguide of an optical power sensor in accordance with various embodiments.

In the embodiment shown in FIG. 7A, the light absorbing or anti-reflection feature provided at the second end 233 of the tap waveguide 232 is an anti-reflection structure that includes an escape slab 239. The escape slab 239 is configured to eliminate the second end reflection of the tap waveguide 232. The escape slab 239 can be formed from the same material as the core material of the tap waveguide 232. Light is leaked out at the second end 233 with negligible or no reflection back to the tap waveguide 232, for instance, the reflection coefficient $\alpha_1$-0.01%.

In order to flatten or reduce the wavelength dependence, and as previously discussed, it may be desirable to design the bolometer 234 to provide 100% or nearly 100% light absorption. Coupling dependence on wavelength can be flattened or reduced by configuring the tap waveguide 232 to provide for adiabatic coupling between the tap waveguide 232 and the main waveguide 110. In general, adiabatic couplers work by adiabatically converting the mode of a single waveguide into either the even or odd mode of two waveguides (e.g., main waveguide 110 and tap waveguide 232) separated by a small gap (e.g., gap G). Adiabatic couplers ensure that only one fundamental mode is excited at all times within the coupler. Advantageously, an adiabatic coupler is inherently broadband, insensitive to fabrication imperfections, and does not require an exact length (as long as it is long enough).

In cases where the absorption in the bolometer 234 is not 100%, some light will hit the termination of the first end 231 of the tap waveguide 232 and get reflected into the bolometer 234. To prevent this from happening, a light absorbing or anti-reflection structure can be placed at the first end 231 of the tap waveguide 232. The light absorbing or anti-reflection structure at the first and second ends 231, 233 can be the same structure or different structures (e.g., any one or any combination of structures 236, 237, 238, 239, and 241 shown in FIGS. 4-7B).

Figure 7B:
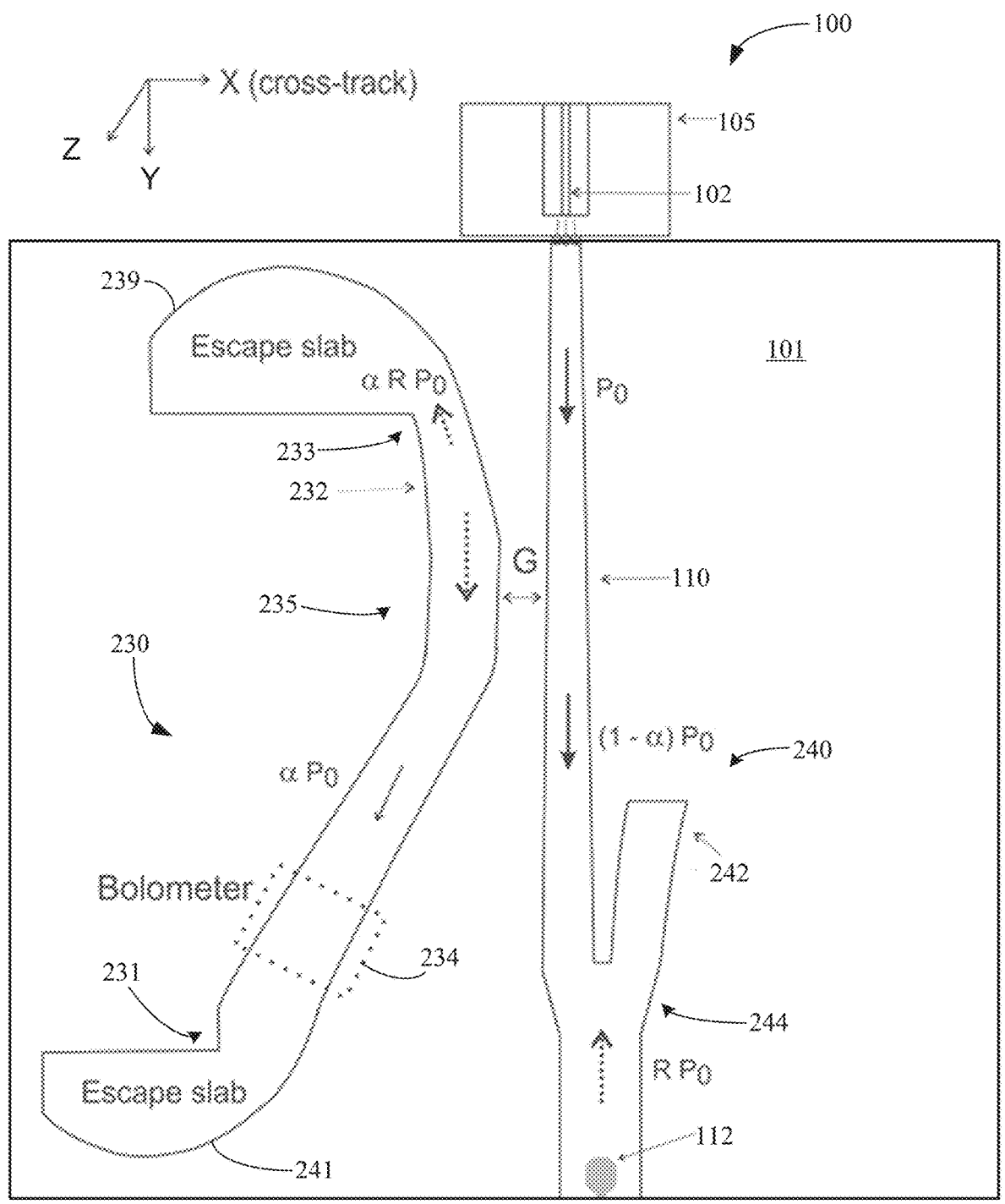
FIG. 7B illustrates a light absorbing or anti-reflection feature provided at both ends of a tap waveguide of an optical power sensor in accordance with various embodiments.

In the representative embodiment shown in FIG. 7B, a first escape slab 241 is situated at the first end 231 of the tap waveguide 232 and configured to eliminate the first end reflection of the tap waveguide 232. A second escape slab 239 is situated at the second end 233 of the tap waveguide 232 and configured to eliminate the second end reflection of the tap waveguide 232. The first and second escape slabs 241, 239 can be formed from the same material as the core material of the tap waveguide 232.

It is noted that, in some embodiments, the optical power sensor 230 can include two bolometers 234. A first bolometer 234 can be situated at the first end 231 of the tap waveguide 232 to sense the forward propagating optical power for automatic power control (APC). A second bolometer 234 can be situated at the second end 233 of tap waveguide 232 to sense the back reflection for process control and design optimization.

Figure 8:
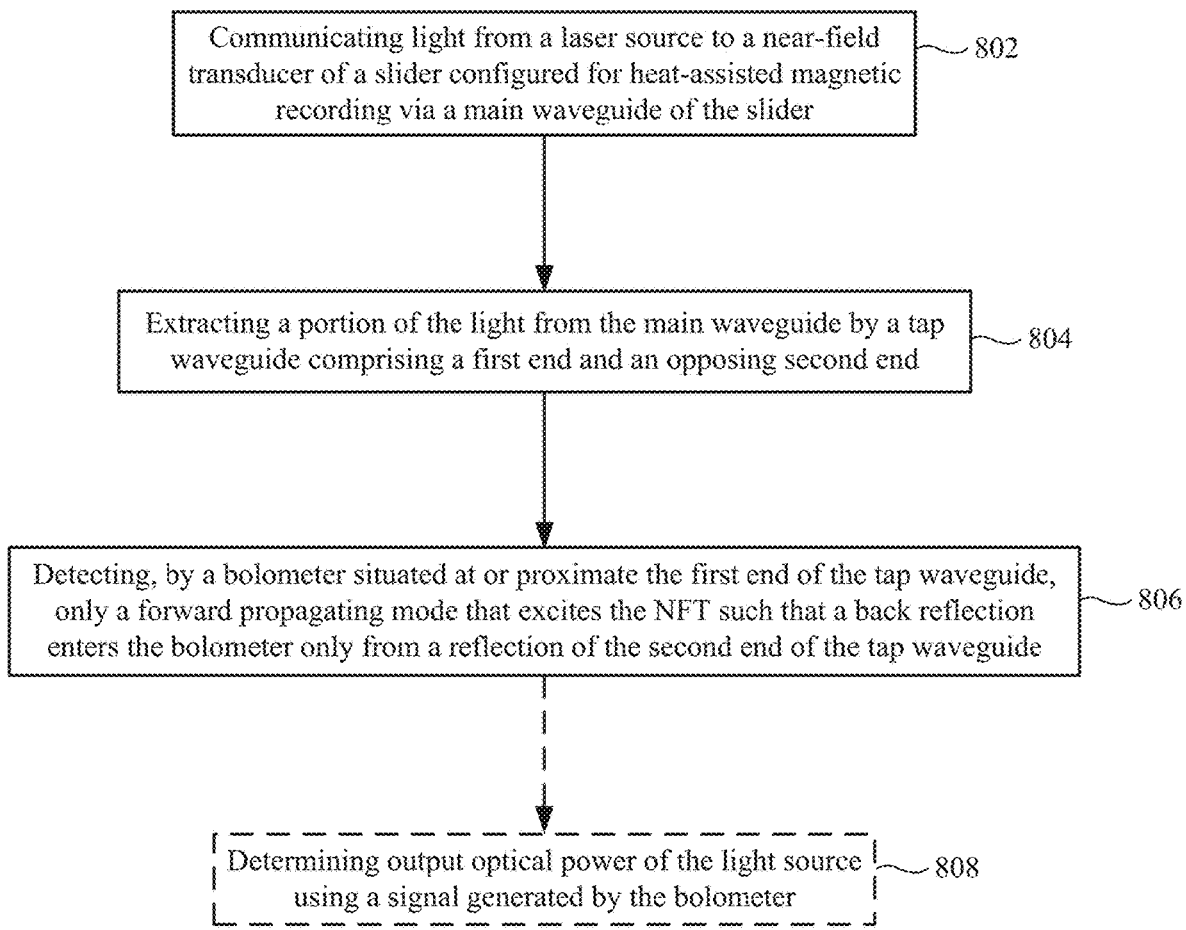
FIG. 8 is a flow diagram illustrating a method of sensing output optical power of a light source optically coupled to a waveguide of a HAMR slider in accordance with various embodiments.

FIG. 8 is a flow diagram illustrating a method of sensing output optical power of a light source optically coupled to a waveguide of a HAMR slider in accordance with various embodiments. The method shown in FIG. 8 involves communicating 802 light from a laser source to a near-field transducer of a slider configured for heat-assisted magnetic recording via a main waveguide of the slider. The method also involves extracting 800 a portion of the light from the main waveguide by a tap waveguide comprising of a first end and an opposing second end. The method further involves detecting 806, by a bolometer situated at or proximate the first end of the tap waveguide, only a forward propagating mode that excites the NFT such that a back reflection enters the bolometer only from a reflection of the second end of the tap waveguide. As previously discussed, a light absorbing or anti-reflection structure can be implemented on the second end to mitigate this reflection. This or another light absorbing or anti-reflection structure can also be implemented at the first end to prevent reflection from the first end. The method can also involve determining 808 output optical power of the light source using a signal generated by the bolometer.

Figure 9:
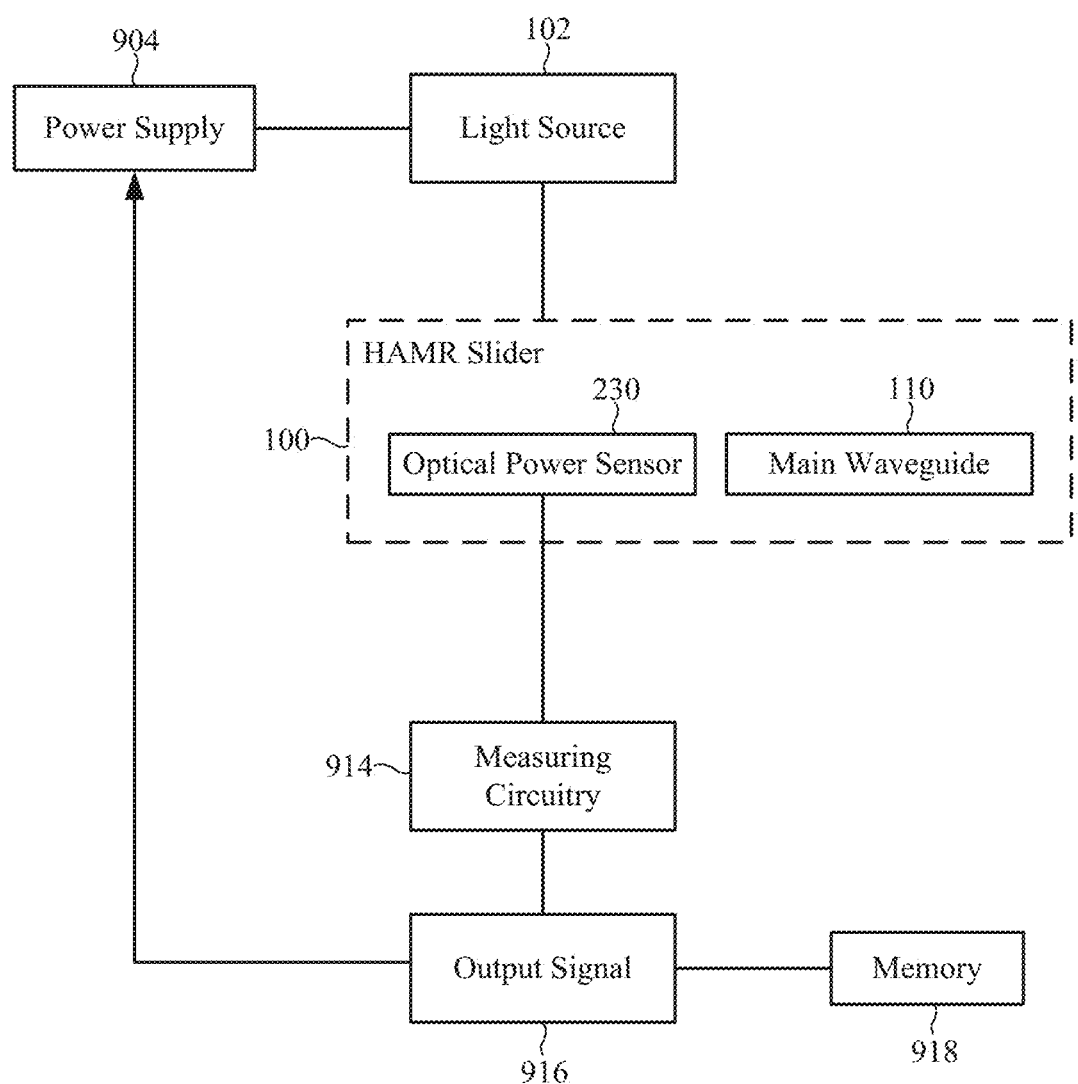
FIG. 9 is a block diagram of a system for laser power monitoring in a HAMR device using an optical power sensor of the present disclosure in accordance with various embodiments.

FIG. 9 is a block diagram of a system for laser power monitoring in a HAMR device (e.g., a HAMR drive) using an optical power sensor of the present disclosure in accordance with various embodiments. The system shown in FIG. 9 includes a light source 102, such as a laser diode, coupled to a power supply 904. Light produced by the light source 102 is communicated to a HAMR slider 100 which includes an optical power sensor 230 of a type previously described. As previously described, a tap waveguide of the optical power sensor 230 is optically coupled to a main waveguide 110 and configured to communicate a portion of extracted light to a bolometer of the optical power sensor 230.

Measuring circuitry 914 is coupled to the optical power sensor 230. The measuring circuitry 914 is configured to receive a signal produced by the optical power sensor 230, such as a signal generated during a write operation. The measuring circuitry 914 is configured to determine the output optical power of the light source 102 using the signal produced by the optical power sensor 230. The measuring circuitry 914 produces an output signal 916 which can be stored in a memory 918. The output signal 916, which is indicative of optical output power of the light source 102, can be fed back to the power supply 904 and used to adjust the current supplied to the light source 102 (e.g., so as to compensate for laser power variation, for instance mode hopping).

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure. As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, "have," "having," "include," "including," "comprise," "comprising" or the like are used in their open-ended sense, and generally mean "including, but not limited to." It will be understood that "consisting essentially of," "consisting of" and the like are subsumed in "comprising," and the like. The term "and/or" means one or all of the listed elements or a combination of at least two of the listed elements.

The phrases "at least one of," "comprises at least one of," and "one or more of" followed by a list refers to any one of the items in the list and any combination of two or more items in the list.

What is claimed is:

1. An apparatus, comprising:
   a slider configured for heat-assisted magnetic recording comprising an air bearing surface (ABS), the slider comprising:
   a write pole at or near the ABS;
   a near-field transducer (NFT) at or near the ABS and proximate the write pole;
   a main waveguide configured to receive light from a laser source and communicate the light to the NFT; and an optical power sensor comprising:
a tap waveguide optically coupled to the main waveguide and comprising a first end and an opposing second end; and
a bolometer optically coupled to the tap waveguide and configured to receive a portion of the light extracted from the main waveguide by the tap waveguide;
wherein the bolometer is offset from the main waveguide at a location such that the bolometer does not directly sense an optical field of the main waveguide at the location.

2. The apparatus of claim 1, wherein the tap waveguide is situated lateral of the main waveguide along a longitudinal section of the main waveguide.

3. The apparatus of claim 1, wherein tap waveguide has an arcuate shape such that the first and second ends are spaced further away from the main waveguide relative to a middle section of the tap waveguide.

4. The apparatus of claim 1, wherein:
the bolometer is situated at or proximate the first end of the tap waveguide; and
a light absorbing or anti-reflection feature is situated at or proximate the second end of the tap waveguide.

5. The apparatus of claim 4, wherein the bolometer and the light absorbing or anti-reflection feature are configured to provide 100% or nearly 100% light absorption.

6. The apparatus of claim 1, wherein the bolometer is situated at or proximate the first end of the tap waveguide such that the bolometer detects only a forward propagating mode that excites the NFT.

7. The apparatus of claim 1, wherein the bolometer is situated at or proximate to the first end of the tap waveguide such that:
the bolometer is configured to detect only a forward propagating mode that excites the NFT; and
a back reflection enters the bolometer only from a reflection of the second end of the tap waveguide.

8. The apparatus of claim 1, wherein the tap waveguide and the bolometer are configured to reduce an impact of back reflection on mode hopping detection by at least a factor of 5 relative to a bolometer situated directly above the main waveguide.

9. The apparatus of claim 1, wherein the main waveguide and the tap waveguide are configured to provide adiabatic coupling therebetween.

10. The apparatus of claim 1, wherein:
the bolometer is situated at or proximate to the first end of the tap waveguide; and
the second end of the tap waveguide comprises an angled end termination.

11. The apparatus of claim 1, wherein:
the bolometer is situated at or proximate to the first end of the tap waveguide; and
the second end of the tap waveguide comprises a dipole nano-rod array.

12. The apparatus of claim 1, wherein:
the bolometer is situated at or proximate to the first end of the tap waveguide; and
the second end of the tap waveguide comprises a dielectric grating.

13. The apparatus of claim 1, wherein:
the bolometer is situated at or proximate to the first end of the tap waveguide; and
the second end of the tap waveguide comprises an escape slab.

14. The apparatus of claim 1, wherein:
the bolometer is situated at or proximate to the first end of the tap waveguide;
a first light absorbing or anti-reflection feature is situated at or proximate the first end of the tap waveguide; and
a second light absorbing or anti-reflection feature is situated at or proximate the second end of the tap waveguide.

15. An apparatus, comprising:
a slider configured for heat-assisted magnetic recording comprising an air bearing surface (ABS), the slider comprising:
a write pole at or near the ABS;
a near-field transducer (NFT) at or near the ABS and proximate the write pole;
a main waveguide configured to receive light from a laser source and communicate the light to the NFT;
a tap waveguide optically coupled to the main waveguide and comprising a first end and a second end;
a light absorbing or anti-reflection feature situated at or proximate the second end of the tap waveguide; and
a bolometer optically coupled to the first end of the tap waveguide and configured to receive a portion of the light extracted from the main waveguide by the tap waveguide, wherein:
the bolometer is configured detect only a forward propagating mode that excites the NFT and a back reflection enters the bolometer only from a reflection of the second end of the tap waveguide; and
the bolometer is offset from the main waveguide at a location such that the bolometer does not directly sense an optical field of the main waveguide at the location.

16. The apparatus of claim 15, wherein tap waveguide has an arcuate shape such that the first and second ends are spaced further away from the main waveguide relative to a middle section of the tap waveguide.

17. The apparatus of claim 15, wherein:
the bolometer is situated at or proximate to the first end of the tap waveguide; and
the second end of the tap waveguide comprises an angled end termination.

18. The apparatus of claim 15, wherein:
the bolometer is situated at or proximate to the first end of the tap waveguide; and
the second end of the tap waveguide comprises a dipole nano-rod array.

19. The apparatus of claim 15, wherein:
the bolometer is situated at or proximate to the first end of the tap waveguide; and
the second end of the tap waveguide comprises a dielectric grating.

20. The apparatus of claim 15, wherein:
the bolometer is situated at or proximate to the first end of the tap waveguide; and
the second end of the tap waveguide comprises an escape slab.

21. A method comprising:
communicating light from a laser source to a near-field transducer of a slider configured for heat-assisted magnetic recording via a main waveguide of the slider;
extracting a portion of the light from the main waveguide by a tap waveguide comprising a first end and an opposing second end; and
detecting, by a bolometer situated at or proximate the first end of the tap waveguide and offset from the main waveguide at a location such that the bolometer does not directly sense an optical field of the main waveguide at the location, only a forward propagating mode that excites the NFT such that a back reflection enters the bolometer only from a reflection of the second end of the tap waveguide.

22. The method of claim 21, comprising determining output optical power of the light source using a signal generated by the bolometer.

\* \* \* \* \*